United States Patent [19]

Puchas

[11] 4,354,567
[45] Oct. 19, 1982

[54] REAR AXLE SUSPENSION SYSTEM FOR MOTOR VEHICLES

[75] Inventor: Christian Puchas, Schwieberdingen, Fed. Rep. of Germany

[73] Assignee: Daimler-Benz Aktiengesellschaft, Stuttgart, Fed. Rep. of Germany

[21] Appl. No.: 177,068

[22] Filed: Aug. 11, 1980

[30] Foreign Application Priority Data

Aug. 11, 1979 [DE] Fed. Rep. of Germany ....... 2932670

[51] Int. Cl.³ .......................... B60K 17/18; B60G 3/08
[52] U.S. Cl. .................................. 180/73 C; 180/254;
180/75; 280/690; 280/701
[58] Field of Search ................ 180/73 R, 73 C, 73 D,
180/73 IL, 75, 254, 256; 280/690, 700, 701

[56] References Cited

U.S. PATENT DOCUMENTS 3,360,068 12/1967 Behles ............................. 180/73 R
3,948,337 4/1976 Richardson et al. ............... 180/256
4,235,300 11/1980 Capjon .............................. 180/254
4,271,922 6/1981 Kishline ............................. 180/254

Primary Examiner—Joseph F. Peters, Jr.
Assistant Examiner—Donn McGiehan
Attorney, Agent, or Firm—Paul M. Craig, Jr.

[57] ABSTRACT

A wheel suspension for driven wheels, especially rear wheels of a motor vehicle, by means of approximately triangular tilted control arms. Each of the control arms includes a longitudinal control arm and a transverse control arm, the transverse control arm is articulated on the vehicle side opposite to the respectively associated wheel supported by the tilted control arm beyond a longitudinal center axis of the vehicle to the vehicle superstructure. A tilted control arm carries an axle gear mechanism connected to the wheel carried by this tilted control arm through a jointless shaft. The wheel of the other tilted control arm is connected to the axle gear mechanism through a jointed or universal shaft.

22 Claims, 3 Drawing Figures

REAR AXLE SUSPENSION SYSTEM FOR MOTOR VEHICLES

The present invention relates to a suspension system and, more particularly, to a wheel suspension system for rear driven wheels, with the suspension being effected by tilted control arms.

A wheel suspension for driven wheels, especially rear wheels of motor vehicles, has been proposed wherein approximately triangular tilted control arms are employed to suspend the driven wheels from the vehicle superstructure. Each of the triangular tilted control arms exhibit a longitudinal control arm and a transverse control arm so as to form a sort of a wishbone, with the transverse control arm being articulated, on the vehicle side oppositely to the respectively associated wheel supported by the tilted control arm, beyond the longitudinal vehicle axis.

In a proposed wheel suspension arrangement, the spacing between the points of articulation of the longitudinal control arm and the transverse control arm of each tilted control arm at the vehicle body structure is especially large so that it is possible to provide a soft, shock-absorbing suspension of the tilted control arms and, in particular, a so called auxiliary frame or subframe may be omitted. Advantageously, the point of articulation of the tilted control arms on the vehicle side lies behind the connecting line from wheel center to wheel center as viewed in a forward driving direction of the vehicle. If increased lateral forces act on the wheels, especially when a curve is traversed, the above-noted features have the effect of the lateral force understeer.

Customarily, the axle gear housing is arranged at the vehicle body structure, when the wheels are driven at each of the tilted control arms by way of double-jointed shafts. The axle gear housing is normally elastically suspended to maintain annoying vibrations and noises away from the vehicle body structure; however, the use of double-jointed shafts is relatively expensive.

The aim underlying the present invention resides in attaining an extensive constructional simplification of the wheel drive mechanism in an arrangement which maximally completely prevents a transmission of vibrations and noises from the axle gear housing to the vehicle body structure.

In accordance with the advantageous feature of the present invention, a tilted control arm is provided which carries an axle gear mechanism connected to the driven wheel carried by the tilted control arm through a jointless shaft. The wheel associated with the other tilted control arm is connected to the axle gear mechanism through a jointed or universal shaft.

By virtue of the above-noted features of the present invention, the axle gear mechanism, that is, in the normal case a differential gear mechanism, is arranged on one of the tilted control arms so that it is possible to connect the wheel associated with this tilted control arm through jointless shaft to the axle gear mechanism. The wheel of the other tilted control arm is coupled to the differential gear mechanism through a jointed or universal shaft.

In comparison to the above-noted construction proposed, as well as in comparison to a conventional drive construction with tilted control arm, it is possible to dispense with the provision of two joints for connecting the shafts of the driven wheels.

In accordance with the further advantageous features of the present invention, the axle gear mechanism requires no additional vibration-damping suspension features since, as part of the associated tilted control arm, it has no direct contact with the vehicle body structure, and the tilted control arms can be resiliently supported at the vehicle body structure through the interposition of elastic support elements.

In accordance with the present invention, advantageously, the axle gear housing is a supporting component of the associated tilted control arms, that is, the axle gear housing is integrated into the tilted control arm thereby resulting in minimizing the total number of structural parts.

In accordance with still further features of the present invention, the axle gear mechanism is mounted so as to be rotatable about a transverse vehicle axis and is supported with respect to the vehicle body structure by means of a torque support thereby achieving the result that the large torques in the direction of the transverse vehicle axis do not act on the tilted control arm carrying the axle gear housing. On the other hand, a sufficient start up compensation can also be attained by counteracting the squat of the rear of the vehicle which is caused during a startup or acceleration of the vehicle by means of the drive torque of the drive shaft operating the axle gear mechanism.

The drive shaft for the second tilted control arm in accordance with the present invention may be constructed as a double jointed shaft or a single jointed shaft. With a single jointed shaft, the second control arm is subdivided so that one part of the task to be fulfilled by the tilted control arm is taken over by the single jointed shaft and another part of the task being taken over by an additional transverse supporting member. The longitudinal control arm and transverse supporting member of the present invention determine the swing axis of the tilted control arm; whereas, the joint of the single jointed shaft controls the camber of the wheel. An advantage of this arrangement resides in the fact that it is possible to do without some of the expensive drive joints which are constructed as homokinetic joints.

The axle gear mechanism of the present invention is disposed approximately in the center of the vehicle and, advantageously, a portion of the transverse control arm which comprises the axle gear housing and which contains the bearing at the vehicle superstructure is flanged to the axle gear housing.

Moreover, in accordance with further features of the present invention, in addition to the axle gear housing being arranged at the associated tilted control arm so as to be rotatable about a transverse vehicle axis, the housing is supported with respect to the vehicle superstructure by means of a lever which, advantageously, is articulated to the vehicle superstructure by means of a bar.

The transverse control arm of the present invention may be subdivided into mutually rotatable sections between the axle gear mechanism and the longitudinal control arm, with the mutually rotatable sections being tubularly nested or telescopically arranged one within the other.

Advantageously, a section on the gear side may be supported so as to be longitudinally displaceable and, preferably in a low friction fashion, in a section on the wheel side, with and the drive shaft of the wheel passing, without axial play, through an interior of the sections connecting the axle gear mechanism to the wheel bearing.

Advantageously, in accordance with further features of the present invention, a second tilted control arm may comprise a single jointed shaft which is arranged, angularly rigidly, in a horizontal plane in the longitudinal control arm and which permits axial play between the axle gear mechanism and the wheel and further include an additional transverse supporting arm.

The drive joint driving the single jointed shaft in accordance with the present invention may be arranged at least in proximity of a longitudinal axis of symmetry of the vehicle and the transverse supporting member may be fashioned as a crossbar and be articulated to the vehicle superstructure on a side of the vehicle oppositely to the associated wheel in order to determine a swing axis of the tilted control arm.

Accordingly, it is an object of the present invention to provide a wheel suspension for driven wheels of a motor vehicle which avoids, by simple means, shortcomings and disadvantages encounted in the prior art.

Another object of the present invention resides in providing a wheel suspension for driven wheels of a motor vehicle which completely prevents any transmission of annoying vibrations or noises from an axle gear housing to the body structure of the motor vehicle.

A further object of the present invention resides in providing a wheel suspension system which is simple in construction and therefore relatively inexpensive to manufacture.

A further object of the present invention resides in providing a wheel suspension for driven wheels of a motor vehicle which has no direct contact with the vehicle body structure.

A still further object of the present invention resides in providing a wheel suspension for driven wheels of a motor vehicle which prevents considerably large drive torques from acting on the control arms of the wheel suspension.

Yet another object of the present invention resides in providing a wheel suspension for driven wheels of a motor vehicle which dispenses with the need for the provision of expensive drive joints.

Yet another object of the present invention resides in providing a wheel suspension for driven wheels of a motor vehicle which insures a stable suspension of the driven wheels during all operating conditions of the motor vehicle.

These and other objects, features, and advantages of the present invention will become more apparent from the following description when taken in connection with the accompanying drawings, which show, for the purposes of illustration only, several embodiments in accordance with the present invention, and wherein.

Figure 1:
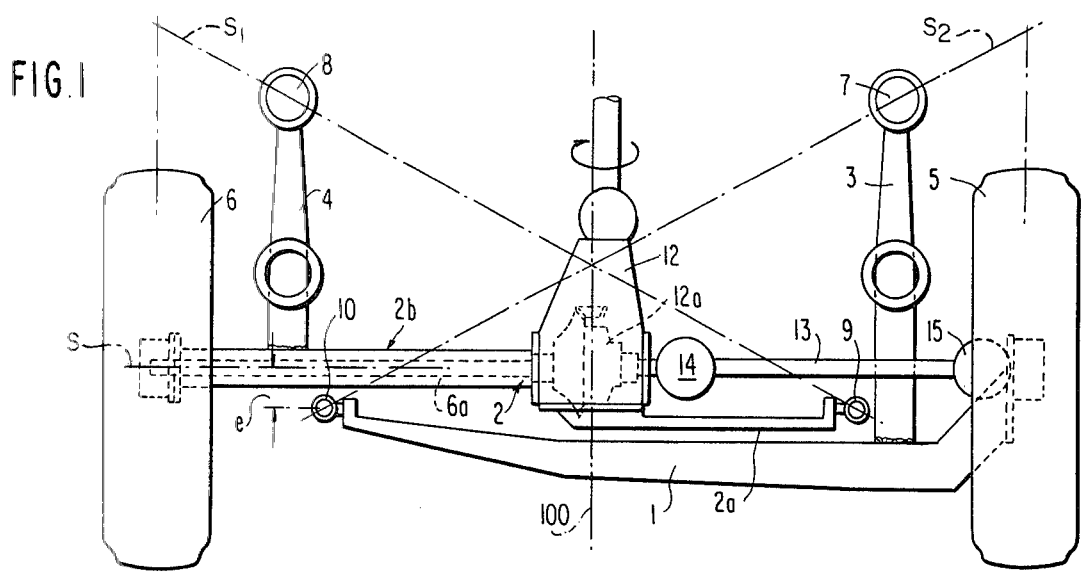
FIG. 1 is a partially schematic top view of a first embodiment of a wheel suspension arrangement in accordance with the present invention employing a double jointed shaft for driving one of the driven wheels.

Referring now to the drawing wherein like reference numerals are used throughout the various views to designate like parts and, more particularly, to FIG. 1, according to this figure, a right-hand tilted control is provided which is formed by a transverse control arm 1 and a longitudinal control arm 3, with the control arms 1, 3 being fixedly joined together by, for example, welding or the like. A left-handed tilted control arm is formed by a transverse control arm generally designated by the reference numeral 2 and a longitudinal control arm 4. The longitudinal control arms 3, 4 simultaneously support the wheel suspension and are respectively movably supported by bearing means 7, 8 at the vehicle body structure (now shown). For this purpose, in order to enable a fixing of the longitudinal control arms 3, 4 to the vehicle body structure, bearings of a conventional construction (not shown) employing rubber elements or the like may be utilized. The transverse control arms 1, 2 are respectively suspended at bearing points 9, 10 to the vehicle body structure. In FIG. 1, the longitudinal center axis of the motor vehicle is designated by the reference numeral 100.

In the arrangement of FIG. 1, a length of the transverse control arms 1, 2 is considerably larger than a half of a track width of the wheels 5, 6. The bearing points of the transverse control arms 1, 2 are displaced toward the rear by a distance e with respect to the wheel axis of symmetry, that is, a connecting line S extending from wheel center to wheel center. During a springing of the wheels 5, 6, the tilted control arms 1, 3 and 2, 4 swing about the tilted control arm swing axes $S_1$, $S_2$ which are determined or defined by a linear connection or a connecting line extending between the bearing points 8, 9 and 7, 10, respectively.

In accordance with the present invention, a housing 12 of an axle gear mechanism 12a, for example, a differential gear mechanism, is an integral supporting component of the transverse control arm 2 and is interposed between a part 2a on a side of the vehicle body structure and a part generally designated by the reference numeral 2b, on a side of the wheel 6, associated with the transverse control arm 2. In this connection, the part 2a is flanged to an end wall of the axle gear housing 12 opposite to the drive or universal shaft of the axle gear mechanism 12a and is thereby connected to the axle gear housing 12.

The axle gear mechanism 12a may be connected to the wheel 6 by means of a jointless shaft, with the part 2b of the transverse control arm 2 between the wheel 6 and gear housing 12 being constructed as a tube which accommodates a drive shaft 6a extending from the axle gear mechanism 12a to the wheel bearing of the wheel 6. The wheel 5 supported on the other tilted control arm 1, 3 is connected to the axle gear mechanism 12a by way of two joints 14, 15 with longitudinal compensation. With the arrangement of FIG. 1, a vibration-damping support for the axle gear housing 12 may be omitted since the tilted control arm 2, 4 carrying the axle gear housing 12 is articulated to the vehicle body structure in a vibration-damping fashion and the bearing points of the tilted control arms 1, 3 and 2, 4 at the vehicle body structure may be made to be relatively resilient due to their large mutual spacing. Consequently, with the arrangement of FIG. 1, there is no danger of a transmission of shocks and noises from the axle gear mechanism 12a to the vehicle superstructure.

Figure 2:
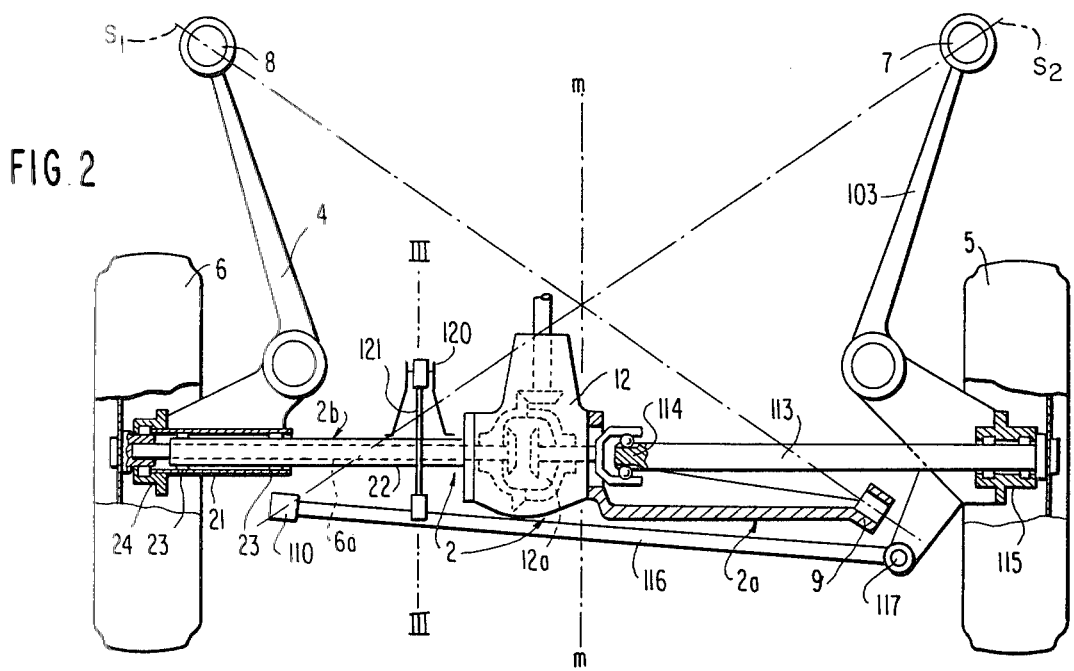
FIG. 2 is a partially schematic top view of a second embodiment of a wheel suspension arrangement in accordance with the present invention employing a single jointed shaft for driving one of the driven wheels.
Figure 3:
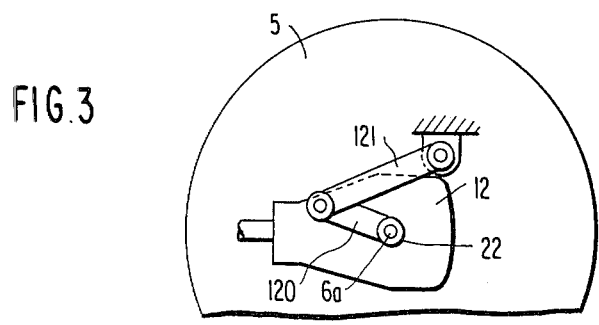
FIG. 3 is a lateral view taken along the line III—III in FIG. 2.

FIGS. 2 and 3 provide an example of a modified embodiment of the wheel suspension shown in FIG. 1 and, according to these figures, apart from the single jointed drive shaft feature more fully explained herebelow, the tubular part 2b of the transverse control arm 2 on the wheel side is subdivided into an outer tube section 21, fixedly joined to the longitudinal control arm 4, and an inner tube section 22 by which the axle gear housing 12 and part 2a of the transverse control arm 2 on a side of the vehicle body structure are fixedly connected as rigid unit. The two tube sections 21, 22 are mutually rotatable relative to each other and, for this purpose, the two sections 21, 22 are telescopically nestled one within the other by way of low friction torsion bearings 23 made, for example, of polytetrafluoroethylene (Teflon), with a connection, for example, an axially supporting bearing 24, being constructed so that a length of the transverse control arm 2 remains constant. The axle gear housing 12 or the tube section 22 of the transverse control arm 2 is respectively connected to a lever arm 120 which extends preferably upwardly or obliquely upwardly. The lever arm 120 is articulated by means of a bar 121 to the vehicle body structure and supported with respect thereto. The lever arm 120 on the bar 121 has the effect of enabling the vehicle body structure to directly absorb all drive torques acting on the axle gear mechanism 12a about a transverse axis of the vehicle during acceleration or during a coasting of the vehicle. Consequently, the generated drive torques have no effect on the transverse control arm 2 carrying the axle gear mechanism 12a.

A relatively minor torque acts on the axle gear housing 12 about the longitudinal center axis of the vehicle m-m. Due to the relatively great length of the transverse control arm 2, the torque produced by the universal shaft is safely absorbed by the tilted control arm 2, 4 containing the axle gear housing 12. On the other hand, this torque is sufficient to counteract a downward deflection of the wheels 5, 6 during a startup of the vehicle to very desirable extent. In spite of the asymmetry of the wheel suspensions, this torque can also act through the vehicle body structure at least in part on the other tilted control arm 1, 3, especially if the tilted control arms are connected by way of a stabilizer which is generally employed in conventional triangulated control axles.

A further difference between the embodiments of FIGS. 2 and 3 and that of FIG. 1 resides in the fact that, as noted above, a single jointed shaft 113 with only one drive joint 114 on a side of the gear mechanism 12a is provided instead of the double jointed shaft arrangement of FIG. 1. On a side of the wheel 5, the shaft 113 forms a unit with the longitudinal control arm 103 of the tilted control arm, the transverse control arm of which is formed, in part, by the single jointed shaft 113. The unit formed by the shaft 113 is rigid in an approximately horizontal plane. To provide support in a transverse direction of the vehicle, a crossbar 116 is provided with the crossbar 116 being articulated at 117 to a longitudinal control arm 103. The longitudinal control arm 103 simultaneously forms a wheel bearing 115. The cross bar 116 serves for supporting of the wheel suspension at 110 to the vehicle superstructure.

The drive joint 114 may be fashioned as a homokinetic joint and permit a longitudinal displaceability between the drive shaft 113 and the axle gear mechanism 12a, with the wheel bearing 115 and/or a wheel carrier being nondisplaceably arranged on the shaft 113. The drive joint 114 is disposed in the vicinity of the longitudinal plane of symmetry or longitudinal center axis m-m of the vehicle. With an arrangement in the longitudinal plane of symmetry m-m, the change in the camber of the wheel 5, 6, with a simultaneous springing thereof, is of equal magnitude. Due to the concomitantly swinging axle gear housing 12, an advantage is attained that the maximum bending angle of the drive joint 114 between the axle gear mechanism 12a and the wheel 5 of the tilted control arm 1, 3 remains small even under a maximum equilateral downward or upward deflection.

Since the axle gear housing 12 is arranged at the associated transverse control arm 2 with a limited spacing from the bearing 9 of the transverse control arm 2 and/or of the swing axis $S_1$, an additional advantage is attained in that the axle gear housing 12, during a downward or upward deflection of the associated wheel 6, executes only a relatively short arc and, consequently, in spite of the mass of the axle gear housing 12, has only little influence on the response sensitivity of the springing of the suspension arrangement.

As can readily be appreciated, the subject matter of the present invention is not limited to the illustrated embodiments and, in particular, features of one embodiment may in each case be exchanged for features in the other embodiment. For example, the torque support afforded by the lever arm 120 and bar 121 with a subdivided tubular part 2b of the transverse control arm or the single jointed drive mechanism of the embodiment of FIGS. 2 and 3 can also be provided in the embodiment of FIG. 1. Likewise, a double jointed drive mechanism such as proposed in FIG. 1 can also be arranged in the embodiment illustrated in FIGS. 2 and 3.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A suspension arrangement for suspending driven wheels of a motor vehicle, the arrangement comprising a first and second tilted control arm means for respectively carrying the driven wheels, each control arm means including a longitudinal control arm and a transverse control arm, characterized in that the first control arm means supports an axle gear housing means accommodating an axle gear means, the axle gear means is disposed approximately in an area of a longitudinal center axis of the vehicle, the first control arm means includes a further member flanged to the axle gear housing means, the further member including means for enabling a pivotable connection of the further member to a structural part of the motor vehicle, a jointless shaft means is provided for operatively drivingly connecting the axle gear means to the wheel carried by said first control arm means, a jointed shaft means is provided for connecting the axle gear means to the wheel carried by the second control arm means, the transverse control arm of the first control arm means includes at least two sections interposed between the axle gear means and the longitudinal control arm of the first control arm means, and in that said at least two sections are mounted so as to be mutually rotatable.

2. A suspension arrangement for suspending driven wheels of a motor vehicle, the arrangement comprising a first and second tilted control arm means for respectively carrying the driven wheels, each control arm means including a longitudinal control arm and a transverse control arm, characterized in that the first control arm means supports an axle gear means, a jointless shaft means is provided for operatively drivingly connecting the axle gear means to the wheel carried by said first control arm means, a jointed shaft means is provided for connecting the axle gear means to the wheel carried by the second control arm means, the transverse control arm of the first control arm means includes at least two sections interposed between the axle gear means and the longitudinal control arm of the first control arm means, and in that said at least two sections are mounted so as to be mutually rotatable.

3. A suspension arrangement according to one of claims 1 or 2 characterized in that each of the tilted control arm means is of an approximately triangular configuration.

4. A suspension arrangement according to one of claims 1 or 2, characterized in that the axle gear housing means is an integral supporting component of the transverse control arm of the first control arm means.

5. A suspension arrangement according to one of claims 1, or 2, characterized in that the jointed shaft means is a double jointed shaft.

6. A suspension arrangement according to one of claims 1, or 2, characterized in that the jointed shaft means is a single jointed shaft.

7. A suspension arrangement according to claim 1, characterized in that the transverse control arm of the first control arm means is constructed so as to enable the axle gear housing means to be rotatable about a transverse vehicle axis, and in that a lever arm means is provided for supporting the transverse control arm of the first control arm means at a structural part of the motor vehicle.

8. A suspension arrangement according to claim 7, characterized in that a bar means is provided for articulatingly connecting the lever arm means to the structural part of the motor vehicle.

9. A suspension arrangement according to claim 1, characterized in that the mutually rotatable sections are tubularly nested one within the other.

10. A suspension arrangement according to claim 9, characterized in that one of the rotatable sections disposed on a side of the axle gear means is supported so as to be longitudinally displaceable in the other rotatable section, and in that a drive shaft longitudinally extends through the two sections for connecting the axle gear means to a wheel bearing without axial play.

11. A suspension arrangement according to claim 10, characterized in that low bearing friction means are disposed between the rotatable sections so as to enable a low friction displaceability between the sections.

12. A suspension arrangement according to claim 10, characterized in that the jointed shaft means is a double jointed shaft.

13. A suspension arrangement according to claim 10, characterized in that the jointed shaft means is a single jointed shaft.

14. A suspension arrangement according to claim 1, characterized in that the jointed shaft means is a single jointed shaft angularly rigidly arranged in a horizontal plane in the longitudinal control arm of the second control arms means, said single joint shaft permitting an axial play between the axial gear means and the wheel, and in that an additional transverse supporting member is articulated to the longitudinal control arm of the second control arm means.

15. A suspension arrangement according to claim 14, characterized in that a drive joint means of the single jointed shaft is arranged at least in proximity of a longitudinal axis of symmetry of the motor vehicle.

16. A suspension arrangement according to claim 15, characterized in that the additional transverse supporting member is formed as crossbar articulatingly connected to a structural part of the motor vehicle at a position spaced from the wheel so as to determine a tilted control arm swing axis.

17. A suspension arrangement according to claim 2, characterized in that the transverse control arm of the first control arm means is constructed so as to enable the axle gear housing means to be rotatable about a transverse vehicle axis, and in that a lever arm means is provided for supporting the transverse control arm of the first control arm means at a structural part of the motor vehicle.

18. A suspension arrangement according to claim 2, characterized in that the mutually rotatable sections are tubularly nested one within the other.

19. A suspension arrangement according to claim 2, characterized in that one of the rotatable sections disposed on a side of the axle gear means is supported so as to be longitudinally displaceable in the other rotatable section, and in that a drive shaft longitudinally extends through the two sections for connecting the axle gear means to a wheel bearing without axial play.

20. A suspension arrangement according to claim 2, characterized in that the jointed shaft means is a single jointed shaft angularly rigidly arranged in a horizontal plane in the longitudinal control arm of the second control arm means, said single jointed shaft permitting an axial play between the axle gear means and the wheel, and in that an additional transverse supporting member is articulated to the longitudinal control arm of the second control arm means.

21. A suspension arrangement according to claim 20, characterized in that a drive joint means of the single jointed shaft is arranged at least in proximity of a longitudinal axis of symmetry of the motor vehicle.

22. A suspension arrangement according to claim 21, characterized in that the additional transverse supporting member is formed as a crossbar articulatingly connected to a structural part of the motor vehicle at a position spaced from the wheel so as to determine a tilted control arm swing axis.

* * * * *